United States Patent Office 3,551,340
Patented Dec. 29, 1970

3,551,340
LIQUID ADDITIVE FOR ALKALINE
PAINT STRIPPERS
Harold A. Skinner, % Wyandotte Chemicals Corp.,
Wyandotte, Mich. 48192
No Drawing. Filed Jan. 2, 1968, Ser. No. 694,817
Int. Cl. C11d 7/06
U.S. Cl. 252—156                                    4 Claims

ABSTRACT OF THE DISCLOSURE

Alkaline paint strippers are prepared by the addition of organic solvents and surfactants which enhance the stripping action of highly caustic types of paint strippers and which will additionally form an evaporation retardant on the surface of the solutions.

The invention relates to an additive for paint stripper compositions. In one aspect, it relates to improved alkaline paint stripper compositions. In another aspect, the invention relates to paint strippers which are particularly effective in removing acrylic paints from metal surfaces.

It is known in the art that surface coatings can be removed by the use of aqueous alkali metal hydroxide solutions. It is also known that certain additives may be added to the solutions to accelerate the paint stripping process. With the recent development of paints that are more durable and tougher than those of the past, it has become a real problem to find paint strippers which are effective in removing these coatings from metal surfaces.

It is, therefore, an object of this invention to provide a composition which will aid in stripping coated surfaces. It is another object of this invention to provide a composition which accelerates the stripping action of aqueous alkali metal hydroxide solutions on coated metal surfaces. It is a further object of this invention to provide a composition which will form an evaporation retardant on the surface of the stripping solutions. It is still another object of this invention to provide a composition that is effective for stripping surfaces coated with commercially available acrylic and modified acrylic surface coatings. Other objects and advantages of this invention will become apparent to those skilled in the art upon consideration of the accompanying disclosure.

The present invention resides in an additive for alkaline paint strippers. Broadly speaking, the paint stripper additive comprises two water-soluble organic compounds, a water-insoluble organic compound, and a surface active agent. More specifically, the additive composition of this invention comprises from about 30% to 59% by weight furfuryl alcohol, from about 30 to 59% by weight of ethoxytriglycol, from about 10 to 20% by weight ethylene glycol phenyl ether, and from about 1 to 5% by weight of a surface active agent. The surface active agents which may be employed in the composition of this invention are the normally liquid nonionic surface active agents obtained by condensing alkylene oxides with water-insoluble organic compounds such as organic hydroxy compounds, that is, alcohols, phenols, thiols, primary and secondary amines, carboxylic and sulfonic acids and their amides. Specific examples of nonionic surfactants that can be employed are disclosed in U.S. 3,310,494 and U.S. 3,314,891. A nonionic surfactant particularly suitable for use in the composition of this invention is an ethoxylated alcohol obtained by condensing ethylene oxide with fatty alcohols containing from 12 to 18, inclusive, carbon atoms, the amount of ethylene oxide generally being in the range of 40 to 80 weight percent of the surfactant composition.

In preparing a paint stripping composition the additive composition is added to an aqueous alkaline solution. The aqueous solution is highly caustic, generally containing from about 15 to 30 weight percent of an alkali metal hydroxide such as sodium or potassium hydroxide. Usually from about 3 to 12 weight percent of the additive composition is added to the aqueous solution. Thus, the resulting paint stripping composition can be defined as an aqueous solution containing about 15 to 30 weight percent of an alkali metal hydroxide, 70 to 85 weight percent of water and from about 3 to 12 weight percent based on said solution, of the above described additive composition.

It has been found that this paint stripping composition is effective in stripping acrylic and modified acrylic paints from ferrous metal surfaces. While it is not intended to limit the present invention to any particular theory as to how the composition functions, it is believed that the water-soluble solvents "salt out" in the highly caustic solution, with the water-insoluble solvent together with a portion of the salted out solvent forming a sealed layer on the solution. The seal retards evaporation of both solvent and water and reduces heat loss. The metal surface which is to be stripped is then immersed in the alkaline solution containing the liquid additive. The temperature of the solution is maintained below about 210° F. in order to prevent boiling of the solution. The preferred temperature range is from about 180° F. to 190° F. While lower temperatures may be used, they are not recommended since higher temperatures accelerate the stripping reaction. The length of time the coated surface is left in the solution will depend upon the amount of stripping desired, that is, the cleaner the surface desired, the longer the surface is exposed to the stripping solution. The time during which the coated surface is contacted with the paint stripper generally ranges from about 5 to 60 minutes although longer times can, of course, be used. Other techniques of stripping may be utilized, such as, spraying, wiping, or the like, but for maximum stripping efficiency, the immersing technique is the more desirable.

A more comprehensive understanding of the invention can be obtained by considering the following examples. However, it should be understood that the examples are not intended to be unduly limitative of the invention.

EXAMPLE I

A series of runs was made in which several paint stripper compositions were prepared by adding a liquid additive to a caustic solution. In each run about 6 weight percent of the additive was added to an aqueous solution containing about 20 weight percent sodium hydroxide. The ingredients of the liquid additive were adjusted for each run in order to demonstrate the synergistic effects of the solvent alcohol and ethoxytriglycol. To test the effectiveness of each of the compositions as a paint stripper, a one inch by two inch panel coated with DuPont acrylic flash primer and acrylic white baking enamel was immersed in each of the solutions. The temperature of the solutions ranges from about 180° F. to 184° F., and the metal panels were immersed therein for a period of from fifteen to eighteen minutes. The panels were then removed from the solution, rinsed with water, dried with compressed air, and evaluated on the basis of the amount of paint removed.

The composition of the liquid additives used together with the results in terms of the paint removed for each liquid additive composition are shown below in Table I.

TABLE I

| Component: | Additive composition percent by weight | | | | |
|---|---|---|---|---|---|
| | A | B | C | D | E |
| Ethoxytriglycol | 89 | 0 | 30 | 59 | 44 |
| Furfuryl alcohol | 0 | 89 | 59 | 30 | 45 |
| Ethylene glycol phenyl ether | 10 | 10 | 10 | 10 | 10 |
| Ethoxylated Alcohol [1] | 1 | 1 | 1 | 1 | 1 |
| Percent of paint removed | 54 | 0 | 16 | 74 | 52 |

[1] Nonionic surfactant prepared from a mixture of 40% by weight fatty alcohols containing 12 to 18 carbon atoms and 60% by weight ethylene oxide.

The above data illustrates the synergistic effect of the solvent alcohol and ethoxytriglycol. It can be seen that with the proper balance of the two water-soluble organic compounds the paint stripping solution is more effective than when using either of the water-soluble organic compounds alone.

EXAMPLE II

A series of runs was made in which several paint stripper compositions were prepared by adding a liquid additive to a caustic solution. In each case the percent of liquid additive and caustic was varied in order to determine the effectiveness of different additive concentrations at various caustic concentrations. To test the effectiveness of each of the compositions as a paint stripper, one inch by two inch panels were coated with DuPont acrylic flash primer and acrylic white baking enamel. The panels were immersed into a 200° F. stripping solution for a period of about 40 minutes, removed, rinsed with water, dried with compressed air, and evaluated on the basis of the paint removed.

The composition of the liquid additive and caustic used together with the results in terms of the paint removed for each combination are shown below in Table II.

TABLE II.—PERCENT BY WEIGHT IN STRIPPING COMPOSITION

| Test No.: | Caustic | Liquid additive [1] | Percent of area stripped |
|---|---|---|---|
| 1 | 10.0 | 0 | 0 |
| 2 | 9.6 | 3.2 | 0 |
| 3 | 9.4 | 6.1 | 0 |
| 4 | 8.8 | 16.7 | 15 |
| 5 | 19.9 | 0 | 0 |
| 6 | 19.3 | 3.2 | 0 |
| 7 | 18.7 | 6.2 | 66 |
| 8 | 17.6 | 12.3 | 83 |
| 9 | 0 | 11.7 | 0 |

[1] Liquid additive, additive consisted of about 30% by weight ethoxy-triglycol, 59% by weight furfuryl alcohol, 10% by weight ethylene glycol phenyl ether, and 1% by weight ethoxylated alcohol.

The above data illustrates the synergistic effect of a specific liquid additive composition and caustic. It can be seen that with the proper balance of liquid additive and caustic in a paint stripping solution, the solution is more effective than when using either the liquid additive or the caustic alone.

EXAMPLE III

A series of tests was performed in order to demonstrate the effect of stripping by the use of a specific liquid additive and varying the caustic level in the paint stripping solution. The coating that was removed was a DuPont acrylic flash primer and DuPont white baking enamel. The tests were conducted under the same conditions as those ilustrated in Example I. The results of these runs are shown below in Table III.

TABLE III

| Percent by wt. of NaOH in the paint stripper solution: | Vol. in ounces/gal. of liquid additive [1] added to the paint stripper | Amount of paint removed in percent |
|---|---|---|
| 50 | 8 | 80 |
| 45 | 8 | 80 |
| 40 | 8 | 80 |
| 35 | 8 | 80 |
| 30 | 8 | 90 |
| 25 | 8 | 90 |
| 20 | 8 | 40 |
| 15 | 8 | 5 |
| 10 | 8 | 0 |
| 5 | 8 | 0 |

[1] Liquid additive, a mixture of about 30% by weight ethoxytriglycol, 59% by weight furfuryl alcohol, 10% by weight ethylene glycol phenyl ether, and 1% by weight ethoxylated alcohol.

The above data illustrates the effect of varying the caustic level in the paint stripping solution. It can be seen that as the caustic level increases from 15 to 30 weight percent, the paint stripping composition increases in effectiveness. At caustic concentrations greater than 30 weight percent, the added caustic either adds nothing or hinders the effectiveness of the paint stripping composition.

EXAMPLE IV

A series of runs was made in which several paint stripper compositions were prepared by adding a liquid additive to a 25% by weight caustic solution. In each case the percent of liquid additive was varied in order to determine the effectiveness of different additive concentrations. The coating that was removed was a Rinshed Mason acrylic white appliance enamel. The tests were conducted under the same conditions as those ilustrated in Example I. The results of these runs are shown below in Table IV.

TABLE IV

| Liquid additive,[1] percent by weight: | Percent of paint stripped | | | |
|---|---|---|---|---|
| | 4 min. | 8 min. | 12 min. | 16 min. |
| 0 | 0 | 0 | 0 | 0 |
| 1 | 0 | 0 | 0 | 0 |
| 3 | 0 | 0 | 10 | 30 |
| 6 | 0 | 20 | 60 | 100 |
| 9 | 0 | 80 | 90 | 100 |
| 12 | 0 | 90 | 100 | 100 |

[1] Liquid additive, a mixture of about 30% by weight ethoxy-triglycol, 59% by weight furfuryl alcohol, 10% by weight ethylene glycol phenyl ether, and 1% by weight ethoxylated alcohol.

The above data illustrates the effect of varying the liquid additive concentration in the paint stripping solution. It can be seen that the paint stripping composition is effective when the liquid additive concentration is from about 3 to 12 weight percent.

What is claimed is:

1. A composition of a liquid additive for alkaline paint strippers consisting essentially of from about 30 to 59 weight percent furfuryl alcohol, from about 30 to 59 weight percent ethoxytriglycol, from about 10 to 20 weight percent ethylene glycol phenyl ether, and from about 1 to 5 weight percent of a liquid nonionic surface active agent which is an alkoxylated alcohol obtained by condensing an alkylene oxide with a water-insoluble organic hydroxy compound selected from the group consisting of alcohols, phenols, thiols, primary and secondary amines, carboxylic and sulfonic acids and their amides.

2. A composition as in claim 1 wherein the surface active agent is an ethoxylated alcohol obtained by condensing ethylene oxide with fatty alcohols containing from 12 to 18, inclusive, carbon atoms and the amount of ethylene oxide being in the range of about 40 to 80 weight percent of the ethoxylated alcohol.

3. A composition of a paint stripper consisting essentially of from about 15 to 30 weight percent of an alkali metal hydroxide, 70 to 85 weight percent water and from about 3 to 12 weight percent based on said solution, of a liquid additive consisting essentially of from about 30 to 59 weight percent ethoxytriglycol, from about 10 to 20 weight percent ethylene glycol phenyl ether, and from about 1 to 5 weight percent of a liquid nonionic surface active agent which is an alkoxylated alcohol obtained by condensing an alkylene oxide with a water-insoluble organic hydroxy compound selected from the group consisting of alcohols, phenols, thiols, primary and secondary amines, carboxylic and sulfonic acids and their amides.

4. A composition as in claim 3 wherein the surface active agent is an ethoxylated alcohol obtained by condensing ethylene oxide with fatty alcohols containing from 12 to 18, inclusive, carbon atoms and the ethylene oxide generaly being in the range of 40 to 80 weight percent of the ethoxylated alcohol.

References Cited

UNITED STATES PATENTS

| | | | |
|---|---|---|---|
| 2,710,843 | 6/1955 | Stebleton | 134—38 |
| 3,179,609 | 4/1965 | Morison | 134—38 |

OTHER REFERENCES

Rose: The Condensed Chemical Dictionary, 6th Ed. (1961), Rheinhold Publishing Co., p. 520.

Glycol-Ethers, Union Carbide Corp. (1966), p. 3.

Mellan: Industrial Solvents, 2nd Ed. (1950), Rheinhold Publishing Co., p. 523.

MAYER WEINBLATT, Primary Examiner

A. RADY, Assistant Examiner

U.S. Cl. X.R.

252—152, 153, 158